United States Patent
Choi

(10) Patent No.: US 7,425,275 B2
(45) Date of Patent: Sep. 16, 2008

(54) SHADOW MASK AND METHOD OF FABRICATING VERTICALLY TAPERED STRUCTURE USING THE SHADOW MASK

(75) Inventor: Duk-yong Choi, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 208 days.

(21) Appl. No.: 11/203,378

(22) Filed: Aug. 15, 2005

(65) Prior Publication Data

US 2006/0032832 A1 Feb. 16, 2006

(30) Foreign Application Priority Data

Aug. 13, 2004 (KR) .................. 10-2004-0063709

(51) Int. Cl.
*B44C 1/22* (2006.01)

(52) U.S. Cl. .............. 216/12; 216/24; 216/41; 216/47; 438/31; 438/40; 438/43; 385/31; 385/129

(58) Field of Classification Search ............ 216/12; 438/31

See application file for complete search history.

(56) References Cited

U.S. PATENT DOCUMENTS 6,030,540 A * 2/2000 Yamamoto et al. ........... 216/47
6,661,009 B1 * 12/2003 Groholski et al. ........... 250/310
6,767,756 B2 * 7/2004 Lee et al. ..................... 438/31
6,778,737 B2   8/2004 Shimoda
6,993,225 B2 * 1/2006 Patel et al. .................... 385/43
2002/0151095 A1 * 10/2002 Kim et al. ..................... 438/31

FOREIGN PATENT DOCUMENTS

| JP | 59-101605 A | 6/1984 |
|----|-------------|--------|
| JP | 5-182948 A  | 7/1993 |
| JP | 6-18737 A   | 1/1994 |
| KR | 95-19787 A  | 7/1995 |

* cited by examiner

*Primary Examiner*—Nadine Norton
*Assistant Examiner*—Maki Angadi
(74) *Attorney, Agent, or Firm*—Sughrue Mion, PLLC

(57) ABSTRACT

A method of fabricating a vertically tapered structure. The method includes placing a spacer layer at a predetermined area on a wafer, placing a mask layer at a predetermined area on the spacer layer, and over-etching the spacer layer, by etching a certain area below the mask layer, fabricating a cantilever type shadow mask having the spacer layer and the mask layer. Thus, it is possible to fabricate the vertically tapered structure of several tens of microns. The vertically tapered structure can be used as the optical waveguide in the optical device to minimize junction loss that may occur between the optical waveguide and the optical fiber.

6 Claims, 6 Drawing Sheets

SHADOW MASK AND METHOD OF FABRICATING VERTICALLY TAPERED STRUCTURE USING THE SHADOW MASK

CROSS-REFERENCE TO RELATED APPLICATIONS

This application claims benefit under 35 U.S.C. § 119 from Korean Patent Application No. 2004-63709, filed on Aug. 13, 2004, the entire content of which is incorporated herein by reference.

BACKGROUND OF THE INVENTION

1. Field of the Invention

The present invention relates to a method of fabricating a vertically tapered structure. More particularly, the present invention relates to a method of fabricating a vertically tapered structure using a shadow mask of a micro unit fabricated by a semiconductor process.

2. Description of the Related Art

Development of information society, which recognizes that organizations success depends on the ability to exploit information, has greatly changed human life. Optical communication technology has been recognized as one of the technologies that facilitates the development of the information society. If the amount of information increases in the future, optical communication is expected to occupy a dominant position in the communication of this information.

An optical device fabricated using $SiO_2$ is mainly used in the current optical communication network. A refractive index of $SiO_2$ is substantially 1.5 or so. Since $SiO_2$ is used in an optical fiber that connects optical devices with each other, an area of an optical waveguide provided inside the optical device corresponds to an area of the optical fiber. Therefore, conventionally, optical loss at a junction area has not caused a big problem.

However, since the optical device fabricated using $SiO_2$ has a relatively great volume, it has a drawback in that it is not suitable for the trend of ultra-small size and ultra-light weight. In this respect, efforts to use an optical device fabricated using silicon have been made. Silicon has a refractive index of 3.5 or so. The size of the optical waveguide can be reduced at several tens of microns($\mu m$) unit if the optical device is fabricated using silicon. However, since an area of the optical waveguide fabricated using silicon is smaller than that of the optical fiber, a problem occurs in that an optical loss at the junction area increases.

In this case, the optical waveguide around the junction area can be fabricated in a vertically or laterally tapered structure to reduce the optical loss at the junction area. In other words, the optical waveguide around the junction area is tapered in a direction vertical or lateral to a waveguide junction direction, so that a shape of guided beam i.e., cross section can be increased. Thus, it is possible to improve the optical efficiency by controlling the optical waveguide so that it corresponds to the cross section of the optical fiber. Meanwhile, a laterally tapered structure can be easily fabricated using a pattern film. However, it is difficult to fabricate a vertically tapered structure.

FIG. 1 is a vertical sectional view illustrating a conventional method of fabricating an optical waveguide of a vertically tapered structure using a photoresist film. Referring to FIG. 1, a photoresist film 14 of a tapered structure is formed on a wafer of a silicon on insulator (SOI) structure in which Si 11, $SiO_2$ 12, and Si 13 are placed sequentially. The photoresist film 14 is then etched. Thus, a vertically tapered area can be fabricated as shown in FIG. 1. However, in case of the method depicted in FIG. 1, it is difficult to position the photoresist film 14 of the tapered structure on the wafer. Also, a problem occurs in that the size of the required tapered area and the angle of the tapered portion are not exactly aligned.

FIGS. 2A to 2C are vertical sectional views illustrating a conventional method of fabricating an optical waveguide of a vertically tapered structure using a shadow mask. Referring to FIG. 2A, a shadow mask 54 is separately fabricated and consists of a spacer layer 54a and a mask layer 54b. The fabricated shadow mask 54 is then joined on the wafer of a SOI structure in which Si 51, $SiO_2$ 52, and Si 53 layers are positioned sequentially. Next, as shown in FIG. 2B, ion beams are scanned into the SOI wafer while the SOI wafer is rotated in a horizontal direction. Thus, the Si layer 53 below the shadow mask 54 is partially etched to form a vertically tapered structure as shown in FIG. 2C.

Referring to FIGS. 2A to 2C, since the shadow mask 54 is fabricated using a mechanical etching process and a junction process, it is difficult to fabricate the shadow mask of a predetermined size or of a small size. Consequently, a problem occurs in that the tapered area depicted in FIG. 2B has a size (length) of several hundreds of microns. Accordingly, it is difficult to fabricate the shadow mask if the tapered area of several tens of microns is required.

Further, it is difficult to exactly align the laterally tapered structure and the vertically tapered structure in case of the method shown in FIGS. 2A to 2C. In other words, a junction error may occur when the shadow mask is fabricated in a vertically tapered structure. Such a junction error may serve as a significant defect in the optical waveguide of several tens of microns.

SUMMARY OF THE INVENTION

Accordingly, the present invention is directed to a shadow mask and a method of fabricating a vertically tapered structure using the shadow mask that substantially obviates one or more of the above-described problems due to limitations and disadvantages of the related art.

One aspect of the present invention is to provide a method of fabricating a vertically tapered structure of a small size using a shadow mask of a micro unit fabricated by a semiconductor process.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

To achieve these aspects and other advantages, as embodied and broadly described herein, a method of fabricating a vertically tapered structure includes the operations of (a) placing a spacer layer at a predetermined area on a wafer, (b) placing a mask layer at a predetermined area on the spacer layer, (c) over-etching the spacer layer, by etching a certain area below the mask layer, fabricating a cantilever type shadow mask having the spacer layer and the mask layer.

Preferably, the method of fabricating a vertically tapered structure further includes the operations of (d) horizontally rotating the wafer in which the shadow mask is fabricated, (e) scanning ion beams into a surface of the wafer at a predetermined tilt angle against a rotational axis of the wafer, and (f) removing the mask layer and the spacer layer.

Preferably, the step (e) includes etching a predetermined area of the wafer below the shadow mask to form the vertically tapered structure as the ion beams are scanned below the shadow mask.

Preferably, the wafer is a silicon on insulator (SOI) wafer in which a first silicon layer, an insulating layer, and a second silicon layer are positioned sequentially.

The spacer layer is made of either $SiO_2$ or polymer, and the mask layer is made of at least one of aluminum, chromium, molybdenum, tungsten, manganese, titanium, nickel, copper, and zinc.

In another aspect of the present invention, a shadow mask that fabricates an optical waveguide includes a spacer layer placed on a predetermined area on a silicon layer on an SOI wafer, and a mask layer having two regions of which one region at a lower surface adjoins the spacer layer and the other region is spaced apart from the silicon layer at a predetermined distance.

BRIEF DESCRIPTION OF THE DRAWINGS

The above aspects and features of the present invention will be more apparent by describing certain exemplary embodiments of the present invention with reference to the accompanying drawings. In the drawings, the same reference characters denote analogous elements, in which.

DETAILED DESCRIPTION OF THE ILLUSTRATIVE, NON-LIMITING EMBODIMENTS

Figure 1:
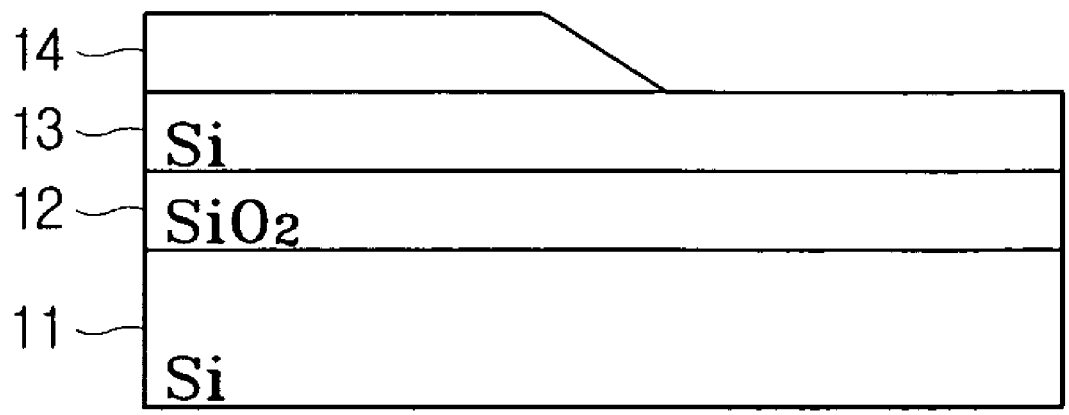
FIG. 1 is a vertical sectional view illustrating a conventional method of fabricating an optical waveguide using a photoresist film.
Figure 1:
Figure 1:
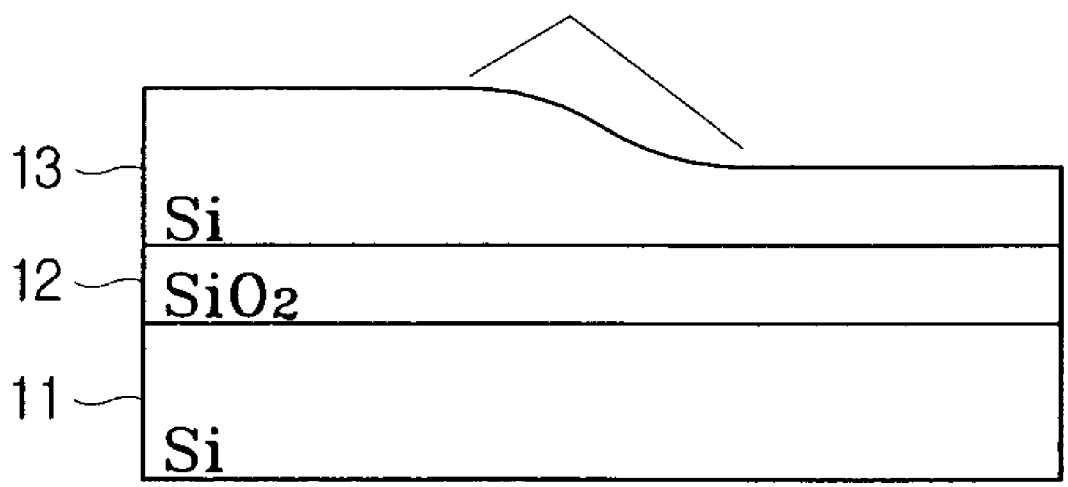
Figure 2A:
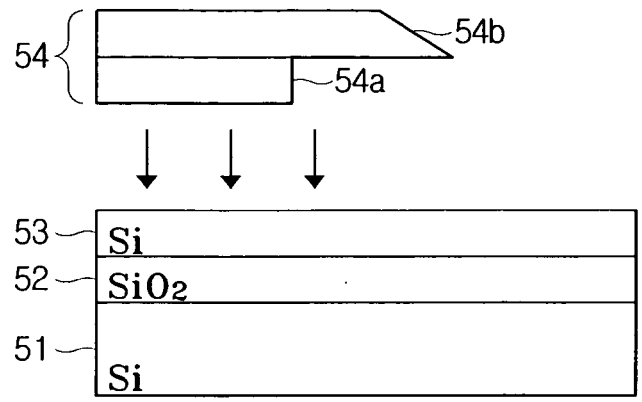
FIGS. 2A to 2C are vertical sectional views illustrating a conventional method of fabricating an optical waveguide using a junction process.
Figure 2B:
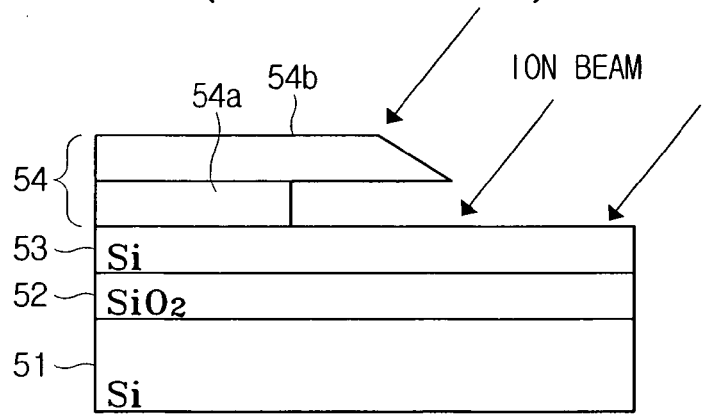
Figure 2C:
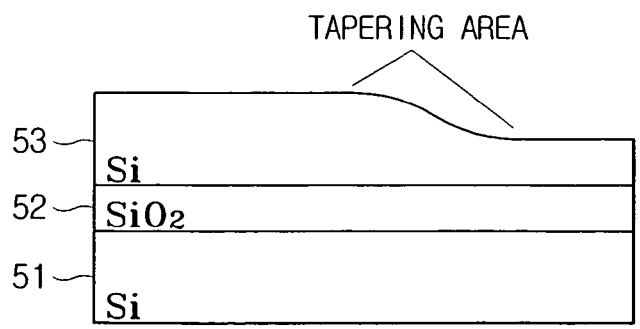
Figure 3:
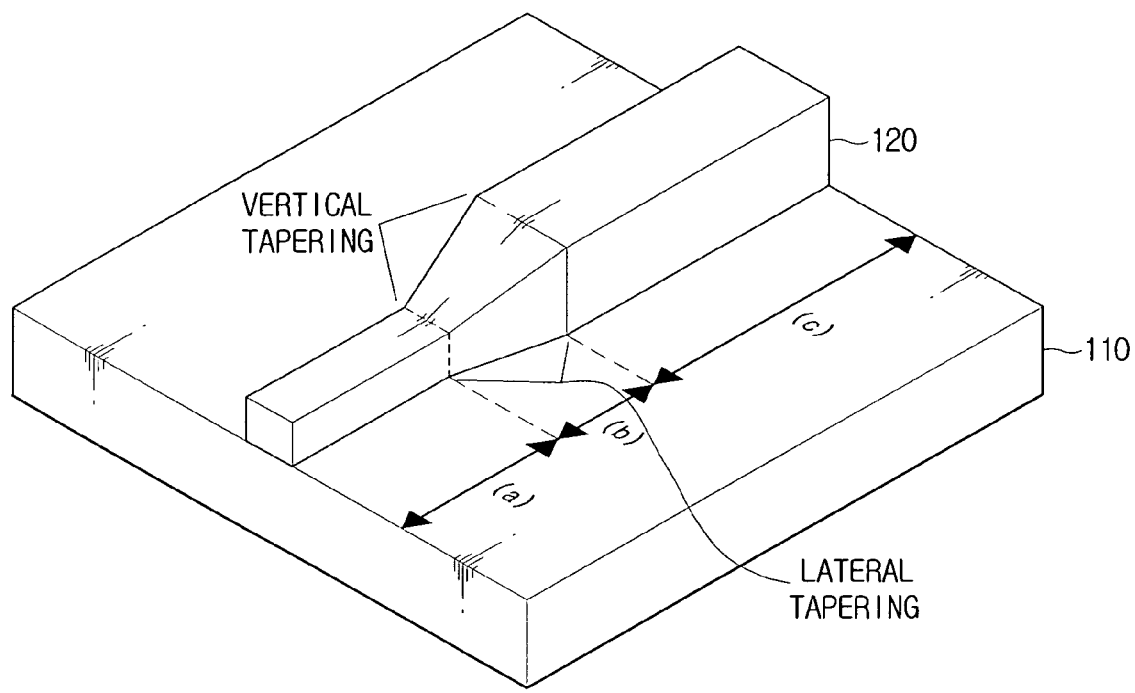
FIG. 3 illustrates a vertically tapered structure according to an illustrative, non-limiting embodiment of the present invention.

FIG. 3 illustrates an optical waveguide according to the exemplary embodiment of the present invention. Referring to FIG. 3, an optical waveguide 120 has a tapered structure in vertical and lateral directions. In other words, the optical waveguide 120 fabricated on a wafer 110 has a reduced sectional area at a junction portion with an optical fiber (not shown). In this case, there are provided three regions (a), (b), and (c) depending on the area of the optical waveguide 120 as shown in FIG. 3. If the optical waveguide 120 is fabricated using silicon, the sectional area in the region (a) can be fabricated at a size of 0.15*0.15 µm2 and the sectional area in the region (c) can be fabricated at a size of 0.25*0.25 µm2. Meanwhile, the region (b) corresponds to a tapered region in vertical and lateral directions. The cross section of the optical waveguide increases while passing through the region (b) so that the cross section in the region (a) is aligned similarly to the cross section of the optical fiber.

Figure 4:
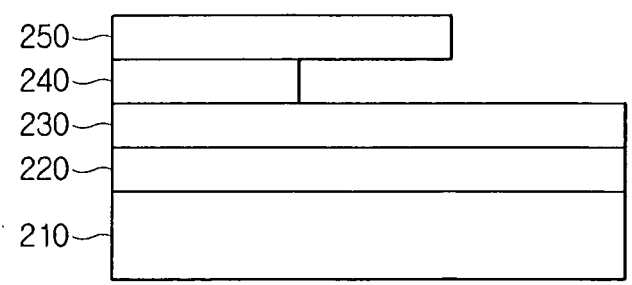
FIG. 4 is a vertical sectional view illustrating a shadow mask according to the exemplary embodiment of the present invention.

FIG. 4 is a vertical sectional view illustrating a shadow mask according to the exemplary embodiment of the present invention to fabricate a vertically tapered structure such as the optical waveguide shown in FIG. 3. Referring to FIG. 4, the shadow mask includes a spacer layer 240 and a mask layer 250 and is fabricated using semiconductor processes such as $SiO_2$ deposition process, patterning process, and etching process. Meanwhile, as shown in FIG. 4, the shadow mask can be fabricated on a SOI wafer not a general wafer. The SOI wafer is a wafer having a structure in which a first silicon layer 210, an insulating layer 220, and a second silicon layer 230 are placed sequentially.

The spacer layer 240 is to isolate the SOI wafer from the mask layer 250 at a certain distance. If the SOI wafer is isolated from the mask layer 250 by the spacer layer 240, ion beams scan a certain area of the SOI wafer below the mask layer 250 so that the surface of the SOI wafer can be etched to form a vertically tapered structure. In other words, ion beams are scanned onto an area below the mask layer 250 for a certain time at a predetermined angle while the wafer, in which the shadow mask is fabricated, is rotated in a direction horizontal to the surface of the earth. If a scanning direction of the ion beams is changed by the rotation of the wafer, the mask layer 250 blocks the ion beams. Therefore, the scanning time of the ion beams at the region where the scanning of the ion beams is blocked by the mask layer 250 becomes relatively shorter than the scanning time of the ion beams at the region where the scanning of the ion beams is not blocked by the mask layer 250. As a result, a tapered structure is formed between the region where the ion beams are scanned entirely and the region where the ion beams are not scanned at all. The tapered structure will be described later.

Figure 5A:
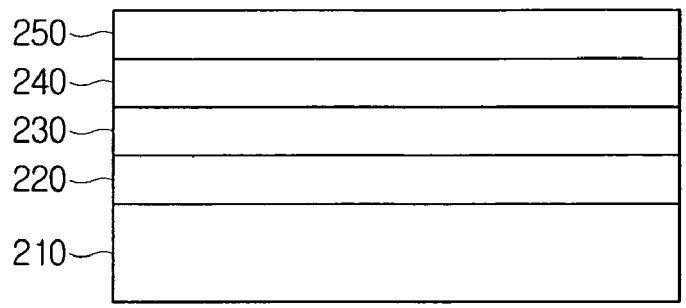
FIG. 5A to FIG. 5F are vertical sectional views illustrating a method of fabricating a vertically tapered structure according to the exemplary embodiment of the present invention.

FIG. 5A to FIG. 5F are vertical sectional views illustrating a method of fabricating a vertically tapered structure according to the exemplary embodiment of the present invention. First, as shown in FIG. 5A, the entire, unetched spacer layer 240 is placed on the surface of the SOI wafer having a structure in which the first silicon layer 210, the insulating layer 220 and the second silicon layer 230 layers are placed sequentially. Although the SOI wafer is shown in FIG. 5A, in accordance with the exemplary embodiment of the present invention, the vertically tapered structure can be fabricated even using a general wafer.

The thickness of the spacer layer 240 is selectively set depending on the length of a vertically tapered structure to be fabricated. In this case, since the thickness of the spacer layer 240 can be controlled using the semiconductor deposition process, the length of the vertically tapered area can be controlled at several tens of microns or less.

Meanwhile, the spacer layer 240 is preferably made of a material that is easily placed and removed, so that the spacer layer 240 can be selectively etched along with the mask layer 250 and the second silicon layer 230. For example, $SiO_2$ or polymer can be used as the spacer layer 240.

Figure 5B:
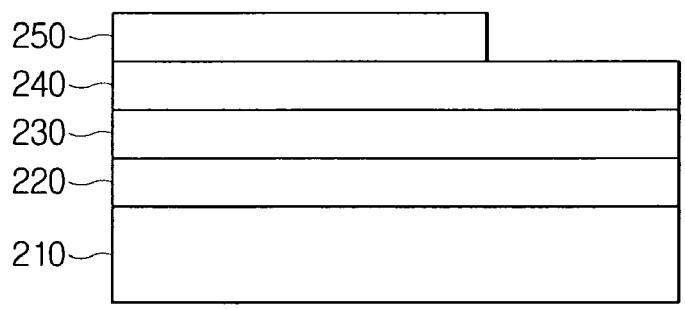

Next, as shown in FIG. 5B, the mask layer 250 is placed on the spacer layer 240 and then the mask layer 250 is patterned to form a predetermined shape. The vertical slope of the vertically tapered structure is determined according to the thickness of the mask layer 250. Therefore, a vertically tapered structure of desired vertical slope can be fabricated by properly adjusting the thickness of the mask layer 250. The mask layer 250 is preferably made of a material endurable to ion beam etching and capable of not being distorted during the formation of the mask. For example, at least one of aluminum, chromium, molybdenum, tungsten, manganese, titanium, nickel, copper, and zinc can be used to form the mask layer 250.

Figure 5C:
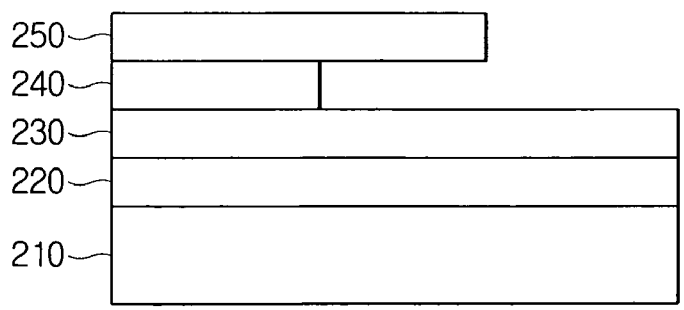

Then, the spacer layer 240 is etched as shown in FIG. 5C. In this case, the spacer layer 240 is over-etched over the region below the mask layer 250 as well as over the region where the mask layer 250 is not formed. Thus, cantilever type shadow masks 240 and 250 are fabricated. For convenience, a junction area between the mask layer 250 and the spacer layer 240 is referred to as a support portion and a region where the mask layer 250 is projected is referred to as a protruding portion.

Figure 5D:
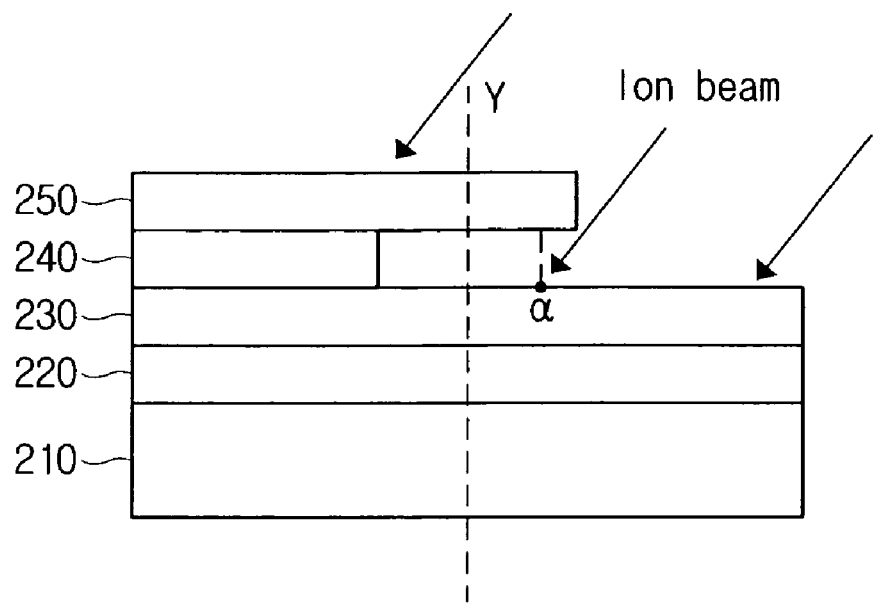
Figure 5F:
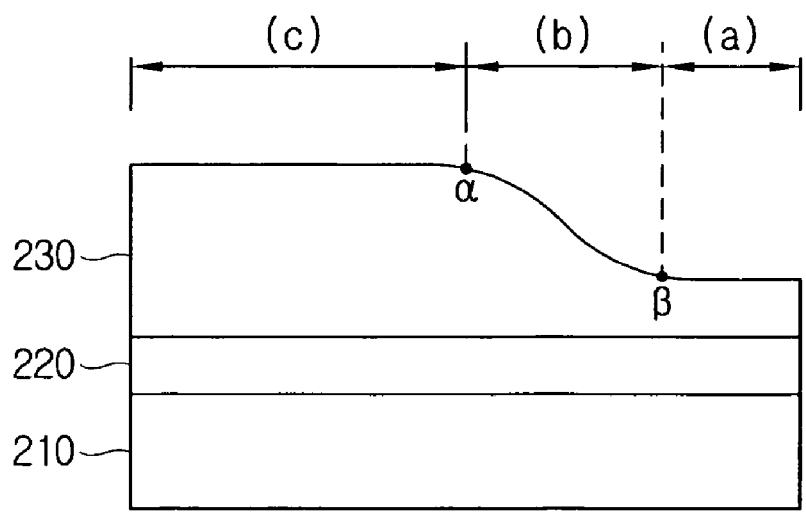
Figure 5E:
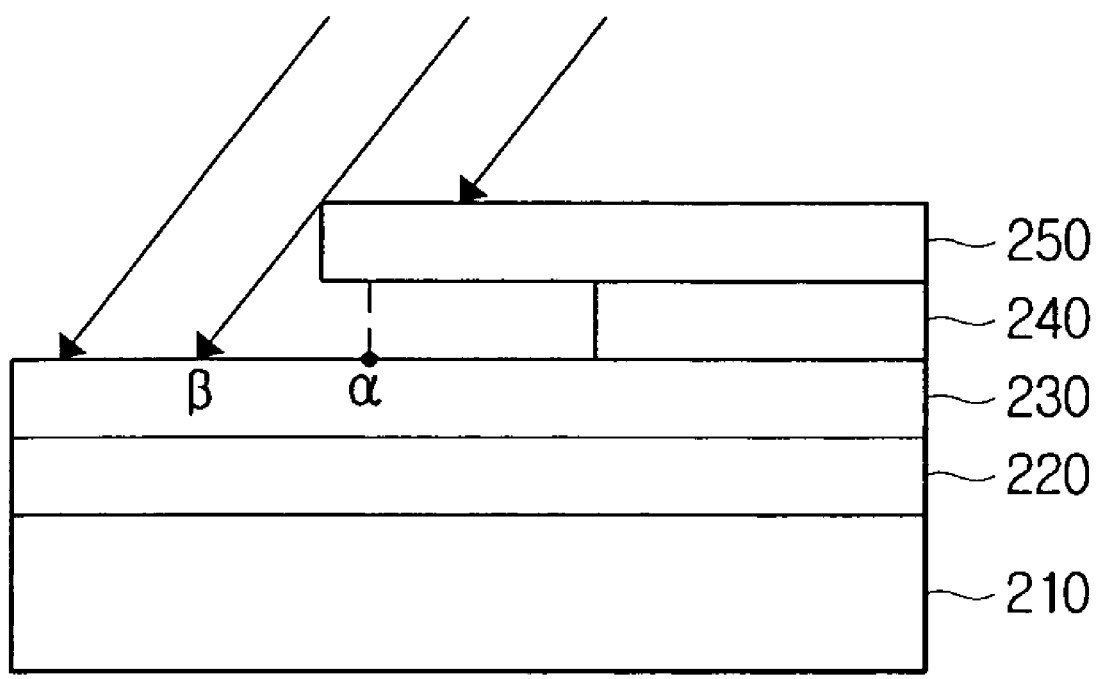

As shown in FIG. 5D and FIG. 5E, the SOI wafer is rotated around the axis Y in a state that it is horizontal to the surface of the earth and at the same time the ion beams are scanned into the SOI wafer at a predetermined angle. In FIG. 5D, the ion beams are scanned into the point α on the second silicon layer 230 below the protruding portion of the shadow mask. In this state, if the SOI wafer is rotated, the ion beams that are scanned below the protruding portion, are partially blocked by the mask layer 250.

FIG. 5E is a vertical sectional view illustrating the state in which the SOI wafer is rotated at an angle of 180°. Referring to FIG. 5E, the ion beams are scanned into the point β on the second silicon layer 230. The portion of the second silicon layer 230 from the point β to the right end of this layer 230 is blocked from the ion beams by the mask layer 250 due to the scanning angle of the ion beams. If the ion beams are scanned while the SOI wafer is rotated, the scanning time of the ion beams on each region of the second silicon layer 230 is varied. In other words, the ion beams are continuously scanned from the left end of the second silicon layer 230 to the point β, the ion beams are scanned for a predetermined time from the point β to the point α, and the ion beams are not scanned from the point α to the right end of the second silicon layer 230. As a result, the second silicon layer 230 from the point β to the point α has a vertically tapered structure.

Finally, as shown in FIG. 5F, the mask layer 250 and the spacer layer 240 are removed to fabricate the vertically tapered structure. The method of fabricating the vertically tapered structure shown in FIG. 5A to FIG. 5F can be applied to the method of fabricating the optical waveguide 120 of the vertically tapered structure shown in FIG. 3. In such case, the region from the left end of the second silicon layer 230 to the point β corresponds to the region (a), and the region from the point β to the point α corresponds to the region (b) constituting the tapered structure. The region from the point α to the right end of the second silicon layer 230 corresponds to the region (c).

Meanwhile, as shown in FIG. 3, to fabricate the laterally tapered structure as well as the vertically tapered structure, an additional process is separately required. In this case, to align the laterally tapered structure and the vertically tapered structure, an align marker pattern is added in the method of fabricating the shadow mask of the exemplary embodiment of the present invention, so that the second silicon layer 230 is etched in an align marker type during the ion beam etching. The second silicon layer 230 is patterned around the fabricated align marker to align the vertically tapered structure with the laterally tapered structure.

As described above, the shadow mask and the method of fabricating the vertically tapered structure using the shadow mask, according to the exemplary embodiment of the present invention, have the following advantages.

After the spacer layer and the mask layer are positioned on the wafer using the semiconductor process, the surface of the wafer is etched using the ion beams to fabricate the vertically tapered structure of several tens of microns. Thus, since the optical waveguide including the vertically tapered structure can be fabricated, the subminiature optical communication network can be realized. Meanwhile, it is possible to avoid incongruity between the laterally tapered structure and the vertically tapered structure. The vertically tapered structure can be used as the optical waveguide in the optical device to minimize the junction loss that may occur between the optical waveguide and the optical fiber.

The foregoing embodiment and advantages are merely exemplary and are not to be construed as limiting the present invention. The above-described exemplary teachings can readily be applied to other types of apparatuses. The above and other features of the invention including various and novel method steps and structure have been particularly described with reference to the accompanying drawings and pointed out in the claims. It will be understood that the particular fabrication method and the structure embodying the invention is shown by way of illustration only and not as a limitation of the invention. The principles and features of this invention may be employed in varied and numerous embodiments without departing from the scope of the invention.

What is claimed is:

1. A method of fabricating a vertically tapered structure comprising:
    placing a spacer layer at a predetermined area on a wafer;
    placing a mask layer at a predetermined area on the spacer layer;
    over-etching the spacer layer, by etching a certain area below the mask layer, fabricating a cantilever type shadow mask comprising the spacer layer and the mask layer;
    rotating the wafer; and
    scanning ion beams into a surface of the wafer at a predetermined tilt angle against a rotational axis of the wafer in which the shadow mask is fabricated, and etching the wafer layer by the mask into an area in which the ion beam is blocked during a predetermined time period, an area in which the ion beam is blocked during an entire time period, and an area in which the ion beam is scanned during an entire time period, to fabricate vertically tapered structure.

2. The method of fabricating a vertically tapered structure according to claim 1, further comprising:
    removing the mask layer and the spacer layer.

3. The method of fabricating a vertically tapered structure according to claim 1, wherein the over-etching comprises etching a predetermined area of the wafer below the shadow mask forming the vertically tapered structure as the ion beams are scanned below the shadow mask.

4. The method of fabricating a vertically tapered structure according to claim 1, wherein the wafer is a silicon on insulator (SOI) wafer comprising sequentially positioned a first silicon layer, an insulating layer, and a second silicon layer.

5. The method of fabricating a vertically tapered structure according to claim 4, wherein the spacer layer is made of one of $SiO_2$ and polymer.

6. The method of fabricating a vertically tapered structure according to claim 1, wherein the mask layer is made of at least one of aluminum, chromium, molybdenum, tungsten, manganese, titanium, nickel, copper, and zinc.

* * * * *